US009435663B2

(12) United States Patent
Cook

(10) Patent No.: US 9,435,663 B2
(45) Date of Patent: Sep. 6, 2016

(54) ABSOLUTE POSITION ENCODER SCALE HAVING LAYERS IN A STACKED CONFIGURATION

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 232 days.

(21) Appl. No.: 14/466,865

(22) Filed: Aug. 22, 2014

(65) Prior Publication Data
US 2016/0054154 A1    Feb. 25, 2016

(51) Int. Cl.
*G01D 5/20* (2006.01)
*G01D 5/245* (2006.01)
*G01D 5/249* (2006.01)
(Continued)

(52) U.S. Cl.
CPC .............. *G01D 5/2066* (2013.01); *G01B 3/205* (2013.01); *G01D 5/2046* (2013.01); *G01D 5/249* (2013.01); *G01D 5/2455* (2013.01); *G01D 5/34776* (2013.01)

(58) Field of Classification Search
CPC .............. G01D 5/2066; G01D 5/2046; G01D 5/2451; G01D 5/2454; G01D 5/2455; G01D 5/2457; G01D 5/34776; G01D 5/20; G01D 5/2086; G01D 5/145; G01B 3/20; G01B 3/205; G01B 7/02; G01B 7/04; G01B 7/042; G01B 7/046
See application file for complete search history.

(56) References Cited

U.S. PATENT DOCUMENTS 3,882,482 A    5/1975    Green et al.
4,109,389 A    8/1978    Balcom et al.
(Continued)

FOREIGN PATENT DOCUMENTS

CA    2068795 A1    2/1993
EP    1 229 301 A1    8/2002
(Continued)

OTHER PUBLICATIONS

"Introduction to Eddy Current Testing," retrieved from https://www.nde-ed.org/EducationResources/CommunityCollege/EddyCurrents/cc_ec_index.htm, retrieved on Aug. 31, 2014, 106 pages.
(Continued)

*Primary Examiner* — Minh N Tang
*Assistant Examiner* — David Frederiksen
(74) *Attorney, Agent, or Firm* — Seed Intellectual Property Law Group PLLC

(57) ABSTRACT

An absolute position encoder scale includes first and second layers in a stacked configuration. A read head moves relative to spatial modulation patterns of first (top) and second (lower) signal layers along a measuring axis, and a sensing portion produces one or more scale sensing fields to sense the signal layers. A higher frequency scale sensing field may provide a first limited sensing depth to sense position relative to the top signal layer pattern, and a lower frequency field may provide a second deeper sensing depth to sense position relative to the lower signal layer pattern. In some embodiments, an isolation layer between the first and second layers may include a spatial modulation pattern that complements the first layer pattern, to nullify its signal effects when sensing position relative to the second layer pattern using the second sensing depth.

20 Claims, 10 Drawing Sheets

(51) Int. Cl.
*G01D 5/347* (2006.01)
*G01B 3/20* (2006.01)

(56) References Cited

U.S. PATENT DOCUMENTS

| | | | |
|---|---|---|---|
| 4,414,754 A | 11/1983 | Lapeyre | |
| 4,717,874 A | 1/1988 | Ichikawa et al. | |
| 4,737,698 A | 4/1988 | McMullin et al. | |
| 4,879,555 A | 11/1989 | Ichikawa et al. | |
| 4,964,727 A | 10/1990 | Huggins | |
| 5,010,655 A | 4/1991 | Rieder et al. | |
| 5,055,784 A | 10/1991 | Jaeger et al. | |
| 5,237,391 A | 8/1993 | Huggins | |
| 5,279,044 A | 1/1994 | Bremer | |
| 5,442,166 A | 8/1995 | Hollmann | |
| 5,541,510 A | 7/1996 | Danielson | |
| 5,773,820 A | 6/1998 | Osajda et al. | |
| 5,804,963 A | 9/1998 | Meyer | |
| 5,841,274 A | 11/1998 | Masreliez et al. | |
| 5,886,519 A | 3/1999 | Masreliez et al. | |
| 5,894,678 A | 4/1999 | Masreliez et al. | |
| 5,901,458 A * | 5/1999 | Andermo | G01D 5/2086 324/207.24 |
| 5,949,051 A * | 9/1999 | Kiriyama | G01D 5/145 235/439 |
| 5,965,879 A | 10/1999 | Leviton | |
| 5,973,494 A | 10/1999 | Masreliez et al. | |
| 5,998,990 A | 12/1999 | Andermo et al. | |
| 6,002,250 A | 12/1999 | Masreliez et al. | |
| 6,011,389 A | 1/2000 | Masreliez et al. | |
| 6,157,188 A | 12/2000 | Steinke | |
| 6,271,661 B2 | 8/2001 | Andermo et al. | |
| 6,304,832 B1 * | 10/2001 | Andermo | G01D 5/2053 324/207.17 |
| 6,476,605 B1 | 11/2002 | de Coulon | |
| 6,611,138 B2 * | 8/2003 | Vasiloiu | G01D 5/2053 324/207.12 |
| 6,642,711 B2 | 11/2003 | Kawate et al. | |
| 6,664,782 B2 | 12/2003 | Slates | |
| 6,781,694 B2 | 8/2004 | Nahum et al. | |
| 6,867,412 B2 | 3/2005 | Patzwald et al. | |
| 7,239,130 B1 | 7/2007 | Milvich | |
| 7,530,177 B1 | 5/2009 | Meichle et al. | |
| 7,973,941 B2 | 7/2011 | Tobiason | |
| 8,309,906 B2 | 11/2012 | Kapner et al. | |
| 2002/0024335 A1 * | 2/2002 | Kiriyama | G01D 5/2086 324/207.17 |
| 2002/0030484 A1 * | 3/2002 | Kiriyama | G01D 3/08 324/207.17 |
| 2002/0097042 A1 | 7/2002 | Kawate et al. | |
| 2003/0128028 A1 * | 7/2003 | Jordil | G01B 3/205 324/207.21 |
| 2003/0160608 A1 * | 8/2003 | Milvich | G01D 5/2053 324/207.17 |
| 2005/0104579 A1 | 5/2005 | Slates | |
| 2006/0103376 A1 * | 5/2006 | Ma | G01B 3/205 324/207.24 |

FOREIGN PATENT DOCUMENTS

| | | |
|---|---|---|
| EP | 1 965 177 A1 | 9/2008 |
| EP | 2 037 261 A1 | 3/2009 |

OTHER PUBLICATIONS

Lefebvre et al., "Pulsed eddy current empirical modeling," Proc. Vth International Workshop, Advances in Signal Processing for Non Destructive Evaluation of Materials, Quebec City, Canada, Aug. 2-4, 2005, X. Maldague ed., E. du Cao (2006), pp. 69-74.

Roach, "Designing and Building an Eddy Current Position Sensor," Sensors Online, Sep. 1, 1998, retrieved from http://www.sensorsmag.com/sensors/electric-magnetic/designing-and-building-eddy-curre . . . , retrieved on Sep. 25, 2014, 49 pages.

Cook et al., "Absolute Position Encoder Scale Having Plates Alternating With Varying Recesses," U.S. Appl. No. 14/303,266, filed Jun. 12, 2014, 48 pages.

Wang et al., "Ultrastable eddy current displacement sensor working in harsh temperature environments with comprehensive self-temperature compensation," Sensors and Actuators A: Physical 211:98-104, 2014.

Qiu et al., "Defect classification by pulsed eddy current technique in con-casting slabs based on spectrum analysis and wavelet decomposition," Sensors and Actuators: A Physical (2013), <<http://dx.doi.org/10.1016/j.sna.2013.09.004>>, 25 pages.

Rosado et al., "Geometric optimization of a differential planar eddy currents probe for non-destructive testing," Sensors and Actuators A: Physical 197, 2013, pp. 96-105.

* cited by examiner

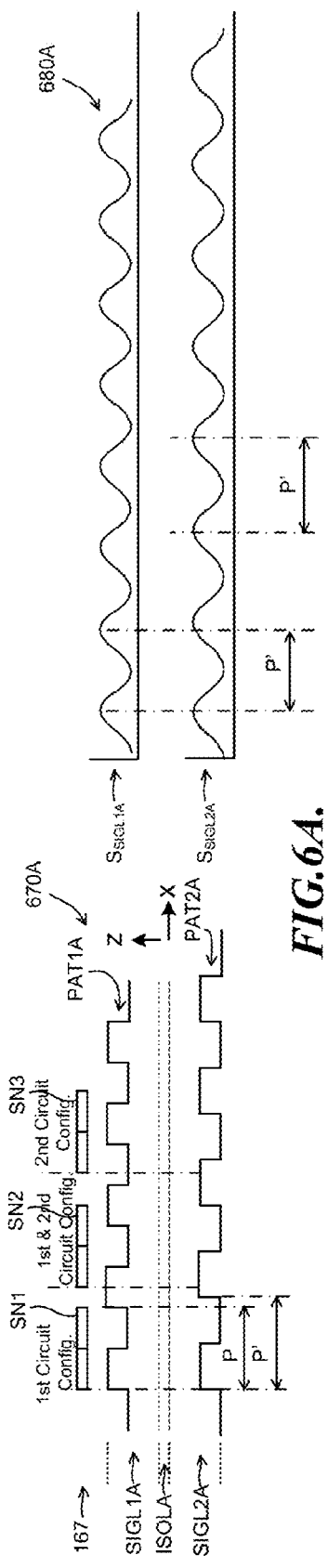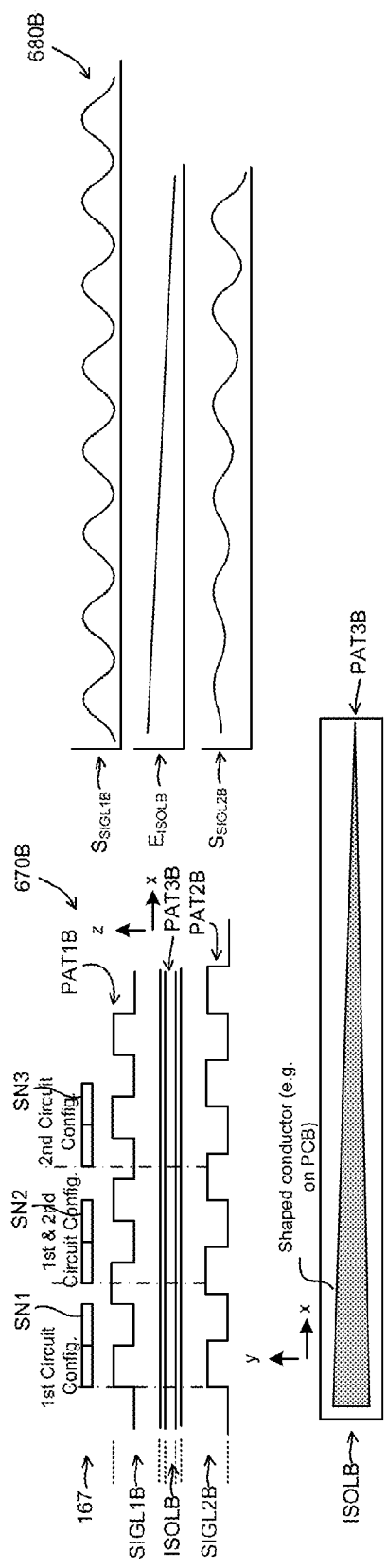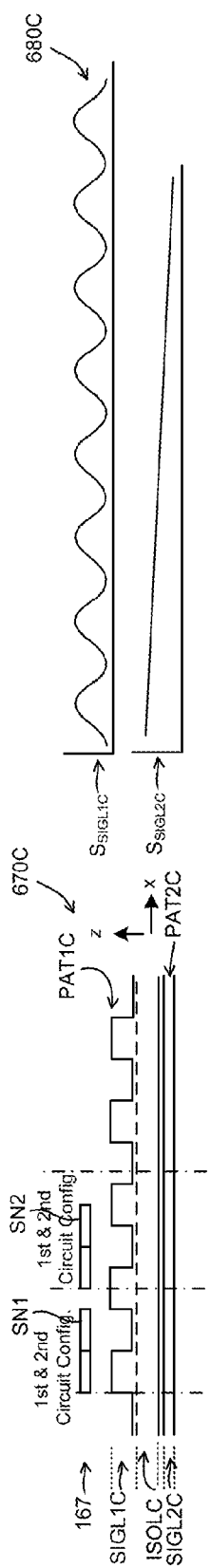

ABSOLUTE POSITION ENCODER SCALE HAVING LAYERS IN A STACKED CONFIGURATION

BACKGROUND

1. Technical Field

The invention relates to precision measurement instruments, and to absolute position encoder scales that may be utilized in handheld instruments such as calipers.

2. Description of the Related Art

Various optical, capacitive, magnetic and inductive transducers, and movement or position transducers are available. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using this induced current transducer. All of the foregoing are hereby incorporated herein by reference in their entireties. As described in these patents, this induced current transducer may be manufactured using printed circuit board technology and is largely immune to contamination.

The transducers outlined above may be implemented as either incremental or absolute position encoders. Incremental position encoders determine the displacement of a read head relative to a scale by accumulating incremental units of displacement, starting from an initial point along the scale. In contrast, absolute position encoders provide a unique output signal, or combination of signals, at each position along a scale. They do not require continuous power for constantly recording accumulation of incremental displacements in order to identify a position. Thus, absolute position encoders allow power conservation and are preferred for low power applications (e.g., handheld calipers).

In addition to the '519, '274, and '678 patents described above for the absolute induced current transducer, U.S. Pat. Nos. 3,882,482, 5,965,879, 5,279,044, 5,237,391, 5,442,166, 4,964,727, 4,414,754, 4,109,389, 5,773,820 and 5,010,655, disclose various encoder configurations and/or signal processing techniques relevant to absolute encoders, and are each hereby incorporated herein by reference in their entirety. However, the disclosed systems are limited in their ability to provide combinations of compact size, high resolution, cost and robustness to contamination desired by users. Configurations of absolute encoders that provide such improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A position sensing device is provided that is usable to measure a position of a first member with respect to a second member along a measuring axis. The position sensing device includes a scale and a read head. The scale comprises first and second layers that extend along the measuring axis and that are stacked on one another along a depth direction that is approximately normal to the scale layers, the first layer comprising material forming a first spatial modulation pattern along the measuring axis, and the second layer comprising material forming a second spatial modulation pattern along the measuring axis that is different than the first spatial modulation pattern over an absolute range along the measuring axis. The read head is movable relative to the first and second layers along the measuring axis direction, and comprises a sensing portion arranged along the depth direction relative to the scale and configured to produce at least one scale sensing field that may be modulated by the first and second spatial modulation patterns of the first and second scale layers. The sensing portion may be used to provide first and second position signal components based on using first and second circuit configurations to provide a first smaller signal-sensing depth and a second larger signal-sensing depth for the at least one scale sensing field. The scale and read head have a configuration wherein: the first layer is closer to the read head along the depth direction than the second layer, and the first spatial modulation pattern of the first layer provides a dominant first position signal component sensed using the first circuit configuration; and the second spatial modulation pattern of the second layer provides a significant second position signal component sensed using the second circuit configuration and a less significant second position signal component when using the first circuit configuration. In some embodiments, the spatial modulation pattern of the second layer provides an insignificant second position signal component when using the first circuit configuration. In various embodiments, the at least one scale sensing field is a changing field and the first circuit configuration corresponds to a higher temporal frequency or frequency range of a scale sensing field, and the second circuit configuration corresponds to a lower temporal frequency or frequency range of a scale sensing field. Various alternatives for the first and second circuit configuration are disclosed below, and may be used separately and/or in combination. Various alternatives for scale layer patterns and/or thicknesses are disclosed herein, and may be used separately and/or in combination to exploit skin depth effects to separate signals derived from different scale layers using the first and second circuit configurations. The spatial modulations of the spatial modulation patterns may comprise thickness, and/or width, and/or material modulation variations, in various embodiments.

It will be appreciated that the configurations disclosed herein have advantages over prior systems. In particular, a robust absolution position sensing device may be provided using a narrower scale, in that co-linear side-by-side scale tracks may be avoided if desired, due in part to using the disclosed stacked configuration(s) for the signal layers of the scale.

BRIEF DESCRIPTION OF THE SEVERAL VIEWS OF THE DRAWINGS

FIGS. 6A-6G are diagrams of alternative embodiments of scale portions and corresponding position signal components.

DETAILED DESCRIPTION

Throughout the figures of this disclosure, it should be appreciated that the z-axis dimensions of one or more scale features may be exaggerated for clarity. The drawings may generally be regarded as partly representational, partly schematic. It will be understood based on this disclosure that the signal separation and or signal isolation achieved by the various scale layer structures disclosed herein may generally depend upon skin depth effects. Skin depth effects, in turn, depend upon both scale layer materials and read head operating frequencies. By way of example, and not by way of limitation, in various embodiments, various layers may have thicknesses (z-axis dimensions) on the order of a portion of a skin depth, or multiple skin depths. A skin depth may be on the order of micrometers to several millimeters, for practical materials and operating frequencies. One of ordinary skill in the art may determine actual z-dimensions in a practical device based on the various operating principles and teachings disclosed herein, supplemented by known methods of analysis and/or testing.

Figure 1:
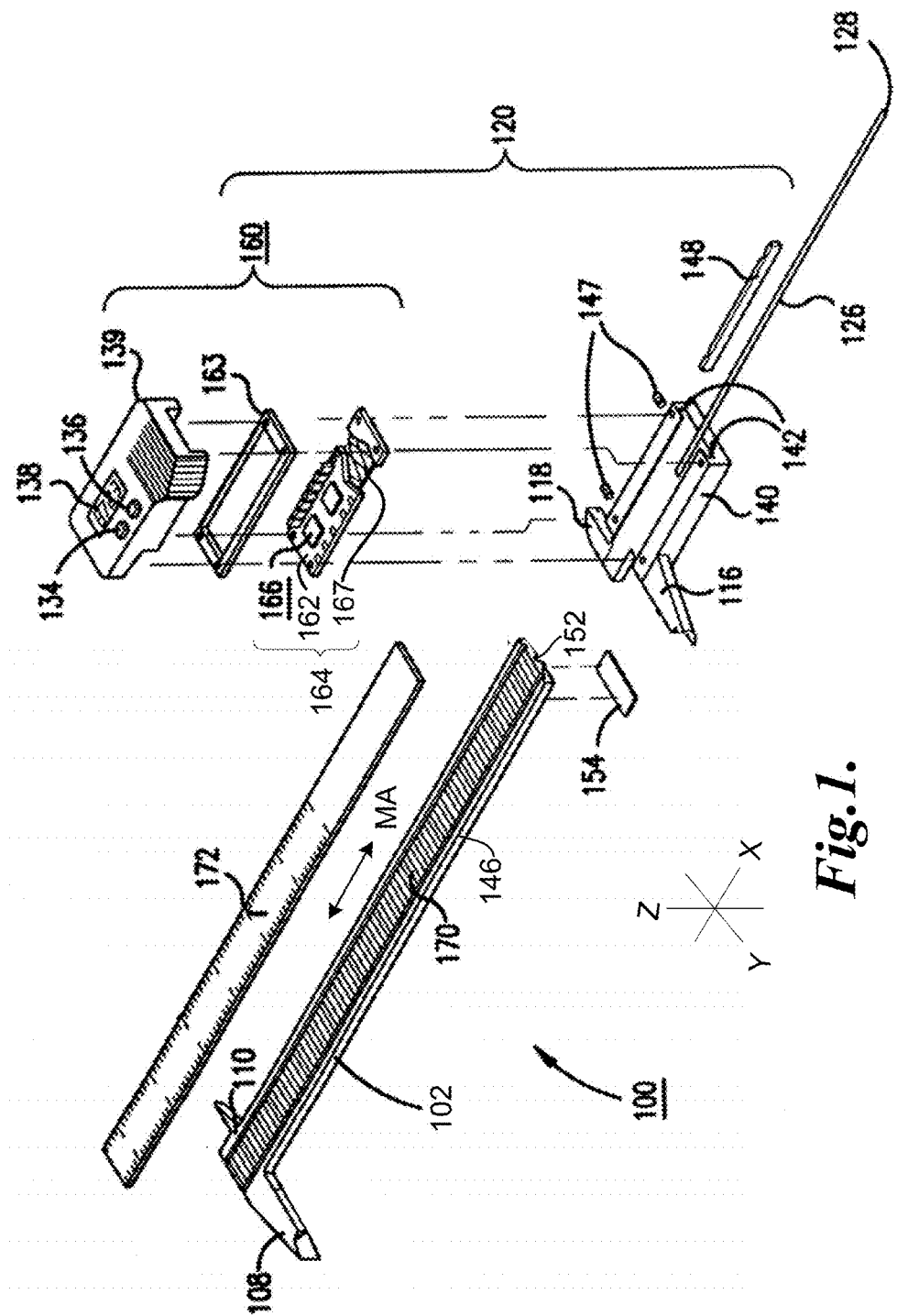
FIG. 1 is an exploded isometric view diagram of a hand tool type caliper including a scale.

FIG. 1 is an exploded isometric view diagram of a hand tool type caliper 100 including a scale member 102 having a spar of roughly rectangular cross-section including a scale 170, and slider assembly 120. As further described with respect to FIG. 2, the scale 170 may include layers (e.g., signal modulating and isolation layers) extending along the measuring axis direction MA (the X axis) and stacked on one another along a depth direction (the Z direction) that is approximately normal to the scale layers. A known type of cover layer 172 (e.g., 100 μm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include on/off switch 134 and zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to insure proper alignment for measuring, and for moving a read head portion 164 relative to the scale 170.

A pickoff assembly 160 mounted on the base 140 holds the read head portion 164 which in this embodiment includes substrate 162 (e.g., a printed circuit board) that carries a sensing portion 167 (e.g., a field generating and sensing winding configuration) arranged along the depth direction relative to the scale 170, and a signal processing and control circuit 166. A resilient seal 163 may be compressed between the cover 139 and the substrate 162 to exclude contamination from the circuitry and connections. The sensing portion 167 may be covered by an insulative coating.

In one specific illustrative example the sensing portion 167 may be arranged parallel with and facing the scale 170 separated by a gap on the order of 0.5 mm along the depth (Z) direction. Together, the read head portion 164 and the scale 170 may form a transducer (e.g., an eddy current transducer which operates by generating changing magnetic fields, as will be described in more detail below with respect to FIG. 2).

Figure 2:
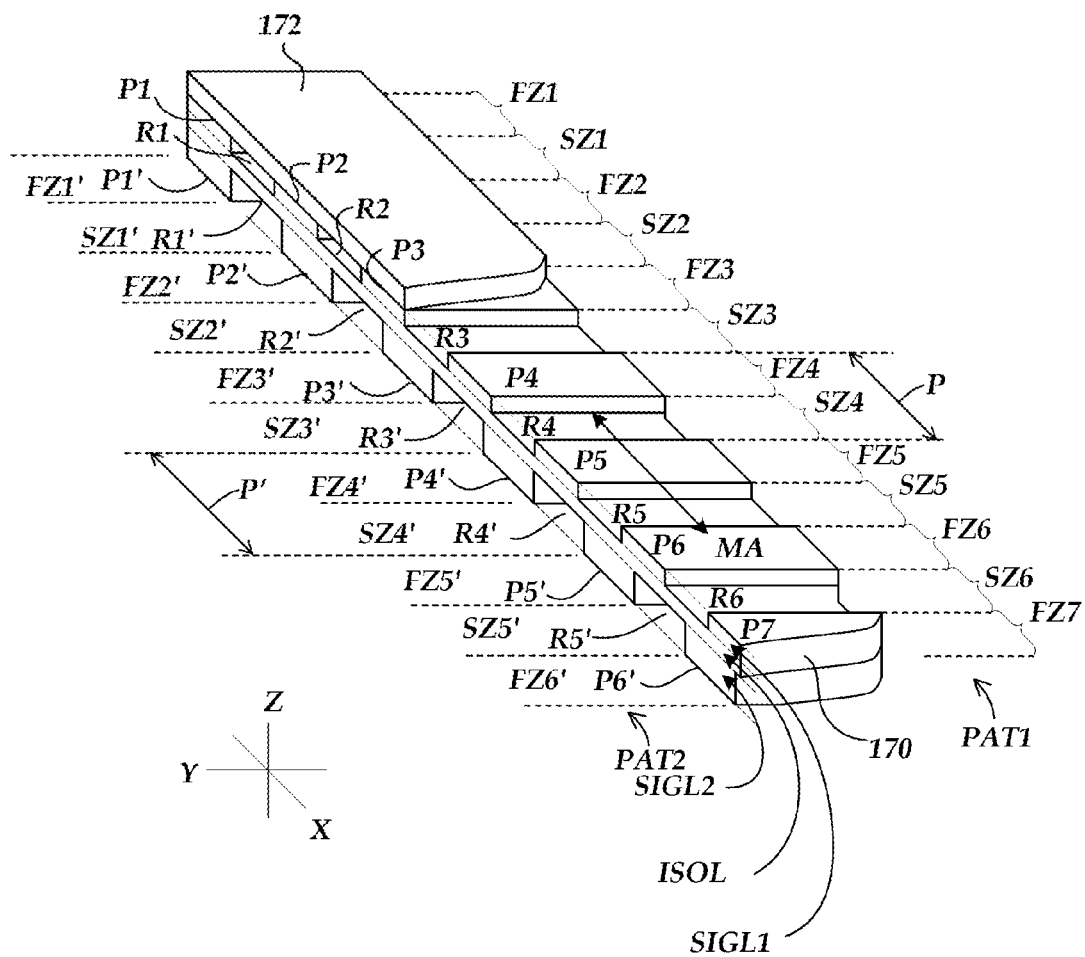
FIG. 2 is an isometric view diagram of a portion of the scale of FIG. 1 illustrating first and second signal layers separated by an isolation layer in a stacked configuration.

FIG. 2 is an isometric diagram of a section of one embodiment of the scale 170 of FIG. 1 illustrating signal layers SIGL1 and SIGL2, "stacked" on (e.g., aligned and adjacent to) one another along the depth (Z) direction. In some implementations, this embodiment may be interpreted to include an optional isolation layer ISOL between the signal layers SIGL1 and SIGL2, as described below. Alternatively, the isolation layer may be omitted in some embodiments and the overall thickness of the scale reduced, or in other embodiments the material shown in the layer ISOL may be attributed to the layer SIGL1 and/or the layer SIGL2, and their imputed thickness dimensions Tiso, T1 and T2 adjusted accordingly (e.g., including assigning Tiso a thickness of zero, such that the layer ISOL is represented as "absent" for such an embodiment). With respect to the following description, the layers SIGL1, ISOL and SIGL2 will be understood to be conceptual layers including features as described. In various implementations, the layers may be fabricated separately and actually "stacked", or may be fabricated as a single piece, in which case they are conceptual layers whose arrangement corresponds to a "stack", etc.

The first signal layer SIGL1 comprises a material forming a first spatial modulation pattern referred to as PAT1 along the measuring axis. Conceptually, PAT1 may be described as a plurality of first scale element zones FZ1-FZ7 alternating with a plurality of second scale element zones SZ1-SZ6 along the measuring axis direction MA, arranged periodically according to a wavelength P. In one embodiment each scale element zone has an X dimension of ½ of the wavelength P. In other embodiments the areas and widths of the first and second scale element zones may differ. PAT1 may be best described as comprising material thickness modulations along the depth (Z) direction, or alternatively, may be described as comprising material width modulations along a direction (Y) transverse to the depth direction and the measuring axis (e.g., zero width plate abatement features are provided, in this embodiment).

In the example of FIG. 2, each of the first scale element zones FZ1-FZ7 includes a conductive plate feature P1-P7 (which may operate to carry eddy currents, in various embodiments). Each of the second scale element zones SZ1-SZ6 includes a "plate abatement" feature comprising a respective void or recessed area R1-R6, and/or a non-conductive material filling each of the second scale element zones SZ1-SZ6 (which may operate to carry lesser or no eddy currents, in various embodiments). Alternatively, the "plate abatement" feature may comprise a conductive material, provided that it has a different conductivity and magnetic permeability compared to that of the plate feature(s). Similar scale operating principles are described in more detail in co-pending and commonly assigned U.S. patent application Ser. No. 14/303,266, filed Jun. 12, 2014, entitled "Absolute Position Encoder Scale Having Plates Alternating With Varying Recesses" (the '266 application), which is hereby incorporated by reference in its entirety.

The second signal layer SIGL2 may be understood by analogy with the first signal layer. It comprises material forming a second spatial modulation pattern PAT2 along the measuring axis that is different than the first spatial modulation pattern PAT1 over an absolute range along the measuring axis. A plurality of scale element zones FZ1'-FZ6' carry plate features PX' (X=1-6), alternating with a plurality of scale element zones SZ1'-SZ5' carrying plate abatement features RX' (X=1-6), all arranged periodically along the measuring axis according to a wavelength P', in this embodiment. Regarding the absolute range referred to above, an absolute range of approximately $(P*P')/|P'-P|$ may be provided in this case, because PAT2 may operate to provide a spatially periodic second position signal component (having a period or wavelength P') that provides a plurality of unique phase relationship values relative to a spatially periodic first position signal component at corresponding positions along the absolute range, where PAT1 operates to provide the spatially periodic first position signal component (having a period or wavelength P). The unique phase relationship values allow respective periods of periodic signals resulting from the configuration of PAT1 to be distinguished from one another, to uniquely indicate respective positions along the absolute signal range, and to further interpolate within respective signal periods according to known methods (e.g., including sinusoidal quadrature signal interpolation methods) to provide high resolution absolute position measurements.

More generally, in alternative implementations (e.g., as described with respect to FIGS. 6C, 6D, 6G), the second spatial modulation pattern of the second layer may be configured to include a variation (e.g., linear or non-linear variation) to provide a second position signal component that includes a signal characteristic that provides a plurality of unique values (e.g., unique signal amplitude or unique second position signal relationship values) relative to the first position signal component at corresponding positions along the absolute range.

In various implementations, the scale 170 may formed from a conducting bulk material (e.g., aluminum, steel, copper, etc.), such that the layers are conceptually "stacked", or the first and second signal layers SIGL1 and SIGL2 (and the layer ISOL) may be fabricated separately utilizing similar or different processes (e.g., as patterned layers in a printed circuit board) and then laminated together, or the like.

Figure 3:
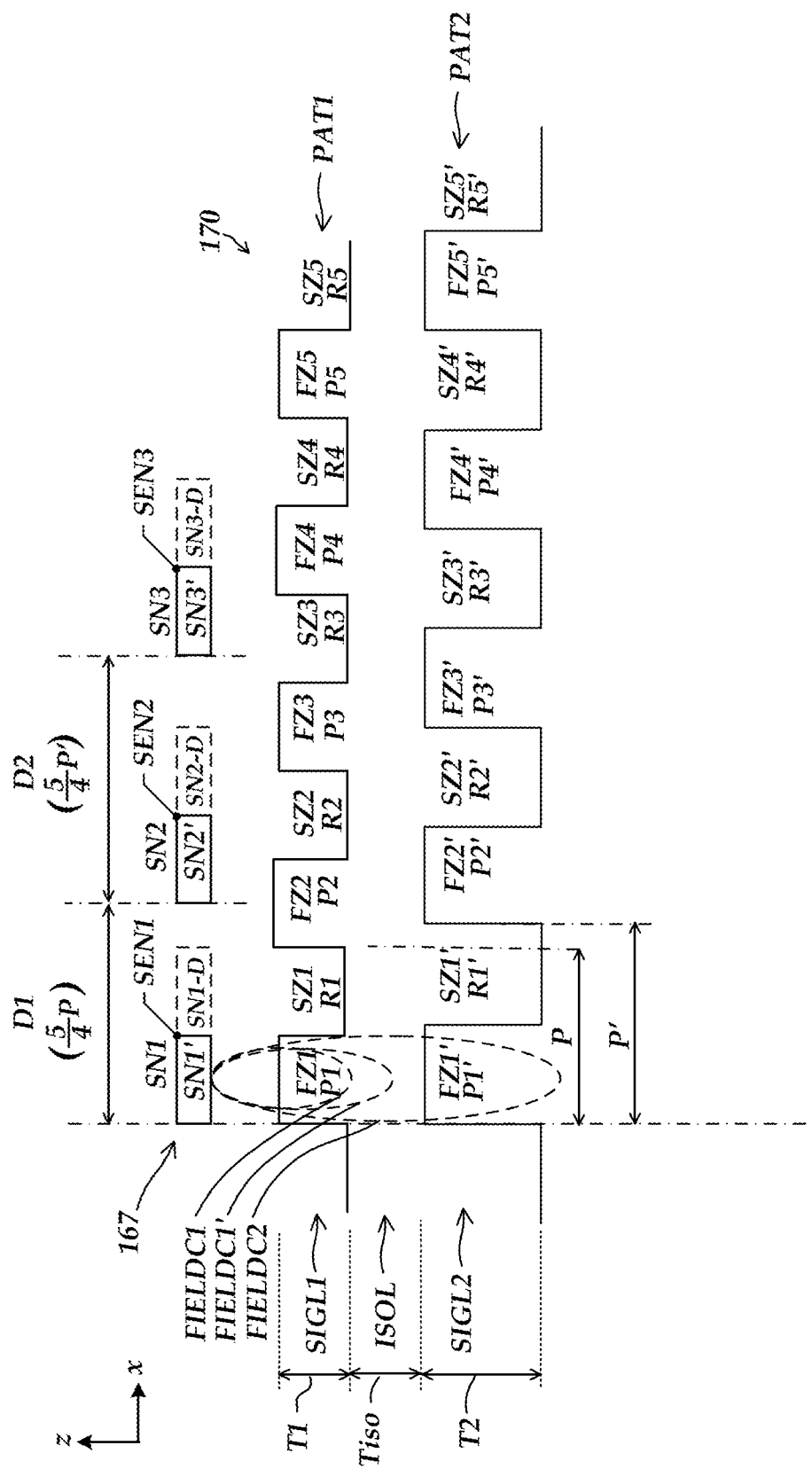
FIG. 3 is a side view diagram of a scale portion illustrating operation with respect to sensing portions of a read head.

FIG. 3 is a schematic side view diagram of a section of one embodiment of the scale 170 of FIG. 2, illustrating operation and features with respect to schematically illustrated sensing portions SN1-SN3 included in one embodiment of a sensing portion 167. In various implementations the sensing portions SN1-SN3 or "SNX" (X=1-3) may comprise a single sensing portion SNX' (X=1-3), respectively, or may comprise differential pair sensing portions SNX'/SNX-D (X=1-3), respectively (e.g., as outlined below with reference to FIG. 4). In any case, the sensing portions provide schematically represented output signals SENX (X=1-3) corresponding to their configuration.

In operation, generally speaking, the signal processing and control circuit 166 and sensing portion 167 are configured to produce at least one scale sensing field that may be modulated by the first and second spatial modulation patterns of the first and second layers, and to provide first and second position signal components based on using first and second circuit configurations (e.g., first and second circuits and/or operating configurations and/or signal processing routines included in the signal processing and control circuit 166) to provide a first smaller signal-sensing depth and a second smaller signal-sensing depth for the at least one scale sensing field.

In FIG. 3, field FIELDC1 or FIELDC1' schematically represent the fields or field components that provide the first smaller signal-sensing depth. Since the first layer SIGL1 is closer than the second layer SIGL2 to the read head and/or the sensing portion 167 along the depth direction, the first spatial modulation pattern PAT1 of the first layer SIGL1 will provides a dominant first position signal component sensed using the first circuit configuration that corresponds to the field FIELDC1 or FIELDC1'. The second layer SIGL2 may be design to lie partially or entirely beyond the sensing range of the field FIELDC1 or FIELDC1', such that it may provide a less significant or insignificant second position signal component in the signal that is sensed using the first circuit configuration. The field FIELDC2 schematically represents the field or field component that provides a second smaller signal-sensing depth that is provided using the second circuit configuration, and includes at least part of the second layer SIGL2. In this case, the second spatial modulation pattern PAT2 of the second layer SIGL2 provides a significant second position signal component sensed using the second circuit configuration.

In various implementations, the first circuit configuration may be designed such that the field or field component FIELDC1 or FIELDC1' does not reach a depth past the first layer SIGL1, or at most not past the isolation layer ISOL. In such a case, the signal effects of the first spatial modulation pattern PAT1 are accurately indicated by the first position signal component sensed using the first circuit configuration, and the read head position may be relatively precisely indicated relative to PAT1 (at least within a local period of PAT1). Furthermore, as outlined above, the signal contribution of PAT1 is accurately isolated at any particular position of the read head relative to the scale using the first circuit configuration. As a result, this provides information that allows the signal processing and control circuit 166 to predict and/or compensate the PAT1 signal contributions to the signals determined using the second smaller signal-sensing depth that is provided using the second circuit configuration (e.g., based on previous analysis and/or calibration). Consequently, the signal processing and control circuit 166 may substantially isolate the desired second position signal component that is due to second spatial modulation pattern PAT2, such that the read head position may be relatively precisely indicated relative to PAT2, and/or the signal characteristic or relationship of the second position signal component that provides a plurality of unique values relative to the first position signal component may be accurately determined along the absolute range.

In an alternative implementation, instead of, or in addition to the prediction and compensation outlined above, the isolation layer ISOL may be formed with a third spatial modulation (not shown in FIG. 2 or 3) that is intended to nullify the effects of the first spatial modulation of the first signal layer SIGL1 when using the field FIELDC2 and the second circuit configuration. For example it may include complementary pattern features (e.g., of opposite spatial phase to those of PAT1), as described below with respect to FIG. 6F.

In various embodiments, the effects and operation outlined above may be achieved by the various configuration outlined following. The read head may be configured to provide at least a scale sensing field that is a changing field and the first circuit configuration corresponds to a higher temporal frequency or frequency range of a scale sensing field, and the second circuit configuration corresponds to a lower temporal frequency or frequency range of a scale sensing field. In various implementations, the first and second circuit configurations may operate according to at least one of one of a) or b), comprising: a) the first circuit configuration provides a first scale sensing field at the higher temporal frequency or frequency range at a first time, the second circuit configuration provides a second scale sensing field at the lower temporal frequency or frequency range at a second time, and the read head senses the first position signal component at the first time and the second position signal component at the second time, or b) the first circuit configuration senses the modulation of the at least one scale sensing field using a higher limited or filtered frequency range which corresponds to the higher temporal frequency or frequency range, and the second circuit configuration senses the modulation of the at least one scale sensing field using a lower limited or filtered frequency range which corresponds to the lower temporal frequency or frequency range. In one sense, operations "a" outlined above correspond to limiting or filtering the frequencies included in the scale sensing field(s) during the "input" or "transmission" of the scale sensing field, and operations "b" outlined above correspond to limiting filtering the frequencies sensed in the scale sensing field(s) during the "output" or "receiving" of the scale sensing field. Methods for implementing such limiting or filtering are known, and are sufficient separately, or may be used in combination in some embodiments. In some embodiments, the first and second circuit configurations operate according to b), and the read head is configured to generate a changing scale sensing field that simultaneously includes both the higher and lower temporal frequencies or frequency ranges.

It will be understood that skin depth effects may be exploited and used in designs that operate according to the principles disclosed herein. The skin depth δ may be approximated by $$\delta = \left(\frac{2\rho}{2\pi f * \mu_r * \mu_0}\right)^{1/2} \qquad \text{EQ. 1}$$

where, ρ=resistivity of the material, f=operating frequency (e.g., the temporal frequency or frequencies outlined above), $\mu_r$=relative magnetic permeability of the material, and $\mu_0$=permeability of free space.

Thus, in various implementations, the first circuit configuration may be implemented such that the field or field component FIELDC1 is not significant at a depth past the first layer SIGL1. In one such embodiment, the first layer has a thickness T1 along the depth direction that is at least one times a first skin depth, or two times, or more, wherein that first skin depth is determined based on a material forming the first spatial modulation pattern PAT1 and the higher temporal frequency or frequency range corresponding to the first circuit configuration. An isolating layer ISOL may be used (if desired) to provide a margin for shielding out the signal modulating effect of PAT2 of the second signal layer SIGL2 when using the first circuit configuration. In one such embodiment, the isolating layer is a material forming a uniform layer, and a thickness of the first layer T1 added to a thickness of the isolating layer Tiso along the depth direction is at least one times a first skin depth, or two times, or more, wherein that first skin depth is determined based on the material forming the uniform layer and the higher temporal frequency or frequency range corresponding to the first circuit configuration.

Of course, according to principles outlined above, the second circuit configuration must be implemented such that the field or field component FIELDC2 is significant at a depth beyond the first layer SIGL1 and/or the isolation layer ISOL, and including at least a spatially modulated part of the second layer SIGL2. In such a case, the first layer SIGL1 and/or the isolation layer ISOL cannot exceed the skin depth associated with the second circuit configuration. In one such embodiment, the first layer has a thickness T1 along the depth direction that is at most 0.5 times a second skin depth, or 0.3 times, or less, wherein that second skin depth is determined based on a material forming the first spatial modulation pattern PAT1 and the lower temporal frequency or frequency range corresponding to the second circuit configuration. If an isolating layer ISOL is used, in one such embodiment, a thickness of the first layer T1 added to a thickness of the isolating layer Tiso along the depth direction is at most 0.5 times the second skin depth, or 0.3 times, or less. In some embodiments, the thickness T2 along the depth direction of the material forming the second spatial modulation pattern of the second layer is at least two times, or three times or more, a thickness T1 along the depth direction of the material forming the first spatial modulation pattern of the first layer, such that the influence of the first spatial modulation pattern on the signal obtained using the second circuit configuration is reduced relative to the influence of the second spatial modulation pattern.

In various implementations, the material of the layers SIGL1, ISOL and SIGL2 may be conducting and/or high magnetic permeability material. In various implementations the read head 164 may sense the signal variations due to the inductance and/or impedance variations created by the spatial modulation patterns. In certain implementations, if the scale material is conductive with low magnetic permeability, then eddy currents may primarily be responsible for signal changes, while if the scale material has high magnetic permeability, then magnetic circuit effects may primarily be responsible for signal changes.

It will be appreciated that a scale with layers aligned or stacked along the Z direction is advantageous in that a narrower scale may be achieved as compared to comparable side-by-side scale tracks. In addition, different fabrication options may be available.

In various embodiments, at various times in a measurement cycle one or all of the various sensing portions SNX may provide signals using the first and/or second circuit configurations outlined above, according to various desired signal processing schemes that will be apparent based on the principles disclosed herein. In the embodiment shown in FIG. 3, the sensing portions SN1 and SN2 have a spacing of D1=5/4P) along the measuring axis, and may be operated using the first circuit configuration to provide quadrature signals SEN1 and SEN2 corresponding to the wavelength P of the first signal layer SIGL1, which may be processed according to known methods to determine displacement and/or position of the read head relative to the features or periods of the first signal layer SIGL1. Similarly, the sensing portions SN2 and SN3 have a spacing of D2=5/4P'), and may be operated using the second circuit configuration and related signal processing as outlined above to provide quadrature signals SEN2 and SEN3 corresponding to the wavelength P' of the second signal layer SIGL2, which may be processed according to known methods to determine displacement and/or position of the read head relative to the features or periods of the second signal layer SIGL2. As outlined previously, a phase difference between the signals determined using the first and second circuit configuration may exhibit a phase difference that may be signal processed to provide an absolute position measurement over an absolute range of approximately (P*P')/|P'−P|.

Figure 4:
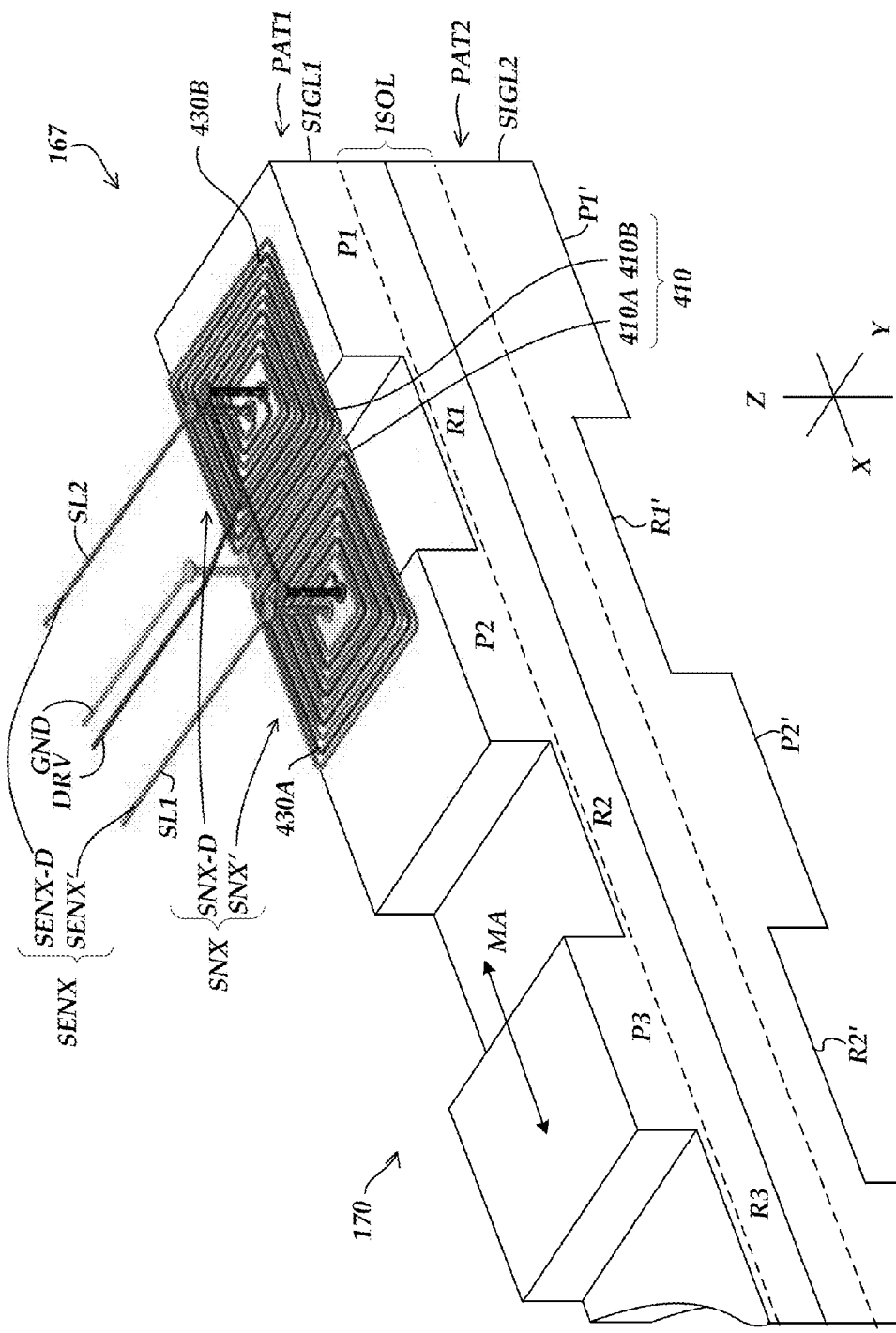
FIG. 4 is an isometric diagram of a sensing portion of a read head for sensing a position relative to a scale portion.

FIG. 4 is an isometric and partially schematic diagram showing one embodiment of a sensing portion SNX usable as one or more of the sensing portions SNX (X=1-3) shown in FIG. 3, or otherwise in various embodiments within the scope of this disclosure. For clarity, only a single differential sensing portion SNX is illustrated in FIG. 4. The sensing portion SNX includes field excitation windings 430A and 430B (of opposite field polarity) connected to a drive terminal DRV controlled by the signal processing and control circuit 166 and the ground terminal GND, and first and second signal windings 410A and 410B (together 410) connected to the ground terminal and that output position signal components SENX' and SENX-D' connected to the signal processing and control circuit 166 through the terminals SL1 and SL2, respectively. The various windings may in one implementation be fabricated in one or more metal layers of a printed circuit board (e.g., a printed circuit board 162 of FIG. 1). In various implementations, the width (Y dimension) of the scale portion 170 may be larger than the width of the sensing portion SNX, to reduce sensitivity to Y direction misalignments. The length (X dimension) of each scale element (e.g., PX, and/or RX) may be approximately the same as 410A (or 4108) (e.g., half of the total combined length of the sensing portion SNX, so as to maximize the resulting signal (e.g., as determined by the differential between the position signal components SENX' and SENX-D).

One embodiment of the electrical connection and operation of the sensing portion SNX and the scale portion 170 is shown schematically in FIG. 5A, and outlined below with reference to FIGS. 4 and 5A.

When operated using the first circuit configuration (e.g., using a first or higher driving and/or signal filtering frequency), and when the sensing portion SNX is moved so that one of the recessed areas R1-R3 of the first signal layer SIGL1 becomes primarily centered under the signal winding 410A (alternatively, 410B), the coupling between the excitation winding 430A (alternatively, 430B) and the signal windings 410A (alternatively, 410B) may be affected to a lesser degree due to the absence or remoteness of the a conductive and/or magnetically permeable material, and the position signal component SENX' (alternatively, SENX'-D) will have a corresponding first polarity value. Conversely, when the sensing portion is moved so that one of the plate areas P1-P3 of the first signal layer SIGL1 becomes primarily centered under the signal winding 410A (alternatively, 410B), the coupling between the excitation winding 430A (alternatively, 430B) and the signal windings 410A (alternatively, 410B) may be affected to a greater degree (e.g., either enhanced by magnetic permeability or reduced due to eddy current effects) due to the proximity of the conductive and/or magnetically permeable material, and the position signal component SENX' (alternatively SENX-D) will have a corresponding second polarity value. Accordingly, the differential between the position signal components SENX' and SENX-D may be utilized to determine the position of the pattern of the first signal layer SIGL1 of the scale portion 170 relative to the sensing portion SNX (at least within one wavelength). A differential signal may provide for improved linearity and robustness by the elimination of certain common-mode errors. As previously outlined, when operated using the second circuit configuration (e.g., using a second or lower driving and/or signal filtering frequency), the field(s) associated with sensing portion SNX may penetrate to the second signal layer SIGL2, and provide a signal component that may be utilized to determine the position of the pattern of the second signal layer SIGL2 of scale portion 170 relative to the sensing portion SNX (at least within one wavelength).

In various implementations, the excitation windings 430 may be driven (e.g., by an excitation signal DRV at the node N3) with a selected waveform pattern (e.g., sinusoidal, quasi-sinusoidal with a pulsed resonant circuit, or a "square wave" pulse, etc.) Various principles for using first and second circuit configurations (which may include respective signal processing circuits and/or routines) in conjunction with the sensing portions and connections shown in FIG. 4 and FIG. 5A, are disclosed herein, and may be implemented by one of ordinary skill in the art based on this disclosure.

Figure 5A:
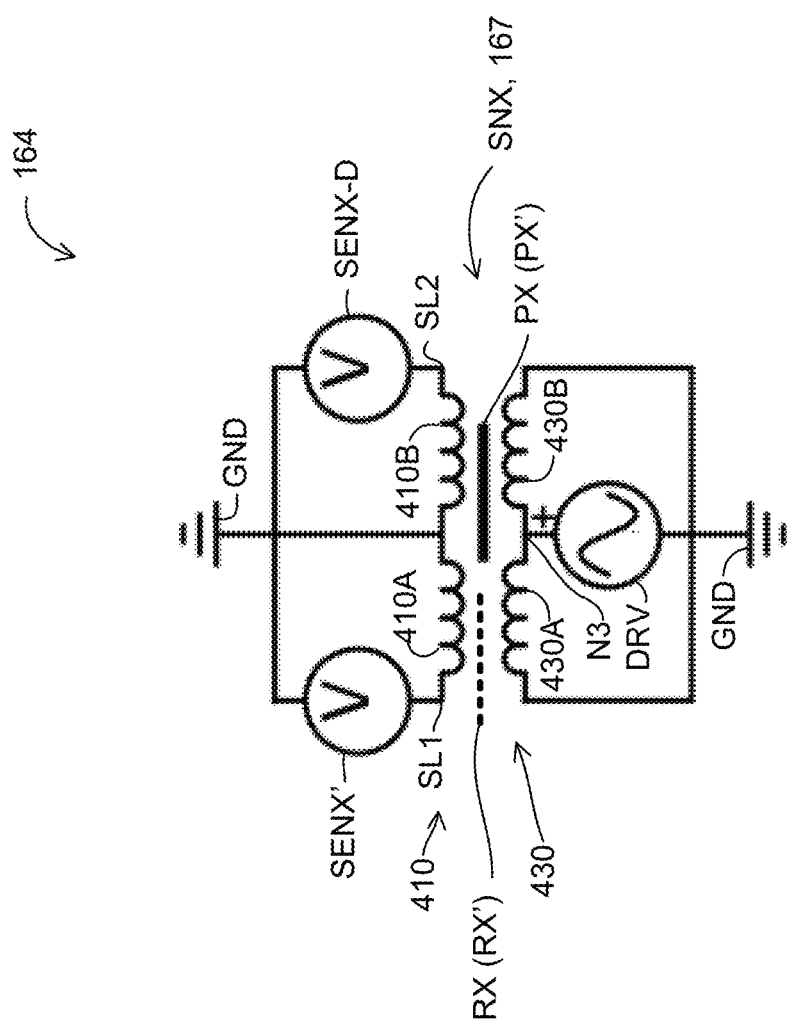
FIGS. 5A and 5B are schematic diagrams illustrating various operating principles of alternative embodiments of a sensing portion of a read head.

While the implementation shown in FIGS. 4 and 5A shows first and second signal windings 410A and 410B which provide separate signals, it should be appreciated that in alternative implementations they may be connected into a single coil with a single output, or they may be replicated at the appropriate spacing along the X direction to provide additional signals, or the like. Furthermore, in other embodiments, other sensing elements (e.g., hall sensors) may be used instead of the windings 410. Thus, the illustrated embodiment is exemplary only, and not limiting.

Figure 5B:
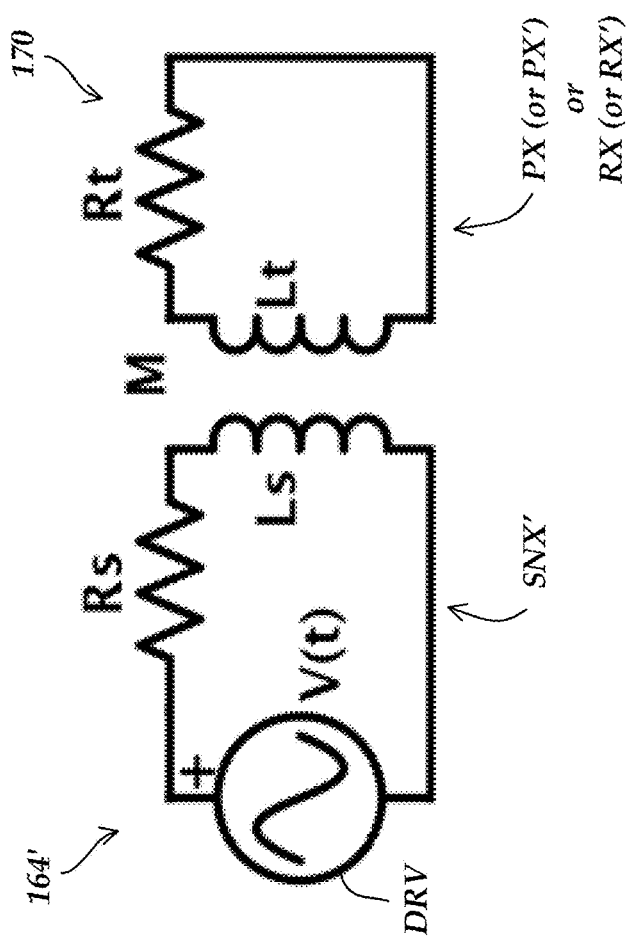

FIG. 5B is a schematic diagram illustrating one embodiment of the electrical connection and operation of a sensing portion SNX' and a scale portion 170, in which a circuit configuration of a read head 164' is used to allow a single winding or sensing portion to perform the function of both an excitation portion and a signal portion. In various implementations, a read head may include one or more such circuits and sensing portions. For purposes of simplifying the present illustration and explanation, only a single scale element PX (or alternatively RX, or the signal generating feature(s) corresponding to PX' or RX') is shown that is proximate to the sensing portion SNX'. As shown in FIG. 5B, the sensing portion SNX' and target scale element "PX" can be modeled as a simple two part circuit, for example, as described in more detail in J. Lefebvre, C. Mandache and J. Letarte, "Pulsed eddy current empirical modeling", *Advances in Signal Processing for Non Destructive Evaluation of Materials*, Quebec City, Canada, 2006. As described therein, some of the key variables that affect the impedance of an eddy current sensor are the physical dimensions and composition of the sensor coil (e.g., SNX'); the drive frequency of the sensor; the conductivity and magnetic permeability of the target scale element PX; irregularities in the target scale element PX; and the gap and alignment of the sensor to the target scale element PX.

As shown in FIG. 5B, the illustrated circuit including the sensing portion SNX' of the circuits of read head 164' on the left functions as both an excitation portion and a signal portion, and has an equivalent inductance Ls, resistance Rs, and is driven by a voltage source V(t). The scale element "PX" on the right is represented by its effective inductance Lt and resistance Rt, and forms a mutual inductance M with the sensing portion SNX'. These effective impedance values for the scale element "PX" depend on $\sigma$, $\mu$, $\omega$, and the system geometry. The coupling of the two circuits depends on the sensor-to-target proximity (e.g., the gap and the position of "PX" along the X direction relative to the read head 164') and is reflected in the mutual inductance $M=k\sqrt{L_s L_t}$. The value of k is $0 \leq k \leq 1$ and increases as the gap decreases. A change in signal and/or complex impedance in the sensing portion SNX' due to the position-depending coupling with the scale element "PX" may provide a corresponding position signal component that may be utilized to determine a position of the sensing portion SNX' relative to the scale element "PX" and the corresponding scale portion 170.

Figure 6D:
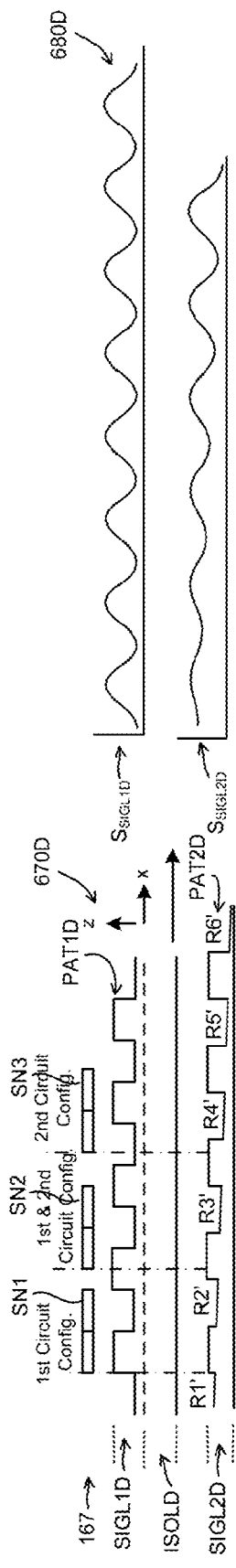

FIGS. 6A-6G are partial schematic diagrams of portions of various embodiments of scales 670A-670G and/or the spatial modulation patterns of their constituent layers, representative sensing portions 167, and illustrative corresponding signal components. Where gaps are shown between layers, for clarity, it will be understood that the layers may abut one another without any gap. In FIG. 6A, a side view cross-section diagram (looking along the Y direction) of a scale portion 670A is illustrated. The scale portion 670A is similar to the scale portion 170 of FIGS. 2-4, and its structure and operation may be understood based on previous description. The first and second signal layers SIGL1A and SIGL2A are separated by an isolation layer ISOLA (e.g., acting as a shield between the layers). The isolation layer ISOLA is generally a material forming a rectangular and/or uniform layer with a consistent width and thickness, as compared to a shaped or patterned material forming an isolation layer including a third spatial modulation pattern, as will be described in more detail below with respect to FIGS. 6B and 6F. 19 Regarding the position signal components 680A, when the sensing portions 167 are operated by the first circuit configuration(s) (e.g. as indicated by the "1st Circuit Config." labels) the first position signal component $S_{SIGL1A}$ corresponding to the first scale pattern PAT1A may be provided by respective sensing portions 167 with their corresponding spatial phase or offset (e.g. to provide quadrature signals.) When the sensing portions 167 are operated by the second circuit configuration(s) (e.g. as indicated by the "2nd Circuit Config." labels), the second position signal component $S_{SIGL2B}$ corresponding to the second scale pattern PAT2A may be provided by respective sensing portions 167 with their corresponding spatial phase or offset. The second position signal components $S_{SIGL2A}$ may require signal processing, as previously disclosed, to isolate them from the effects of the first scale pattern PAT1A, when using the second circuit configuration. The signal components show spatially periodic variations (e.g., resulting from the conductive plate areas alternating with the recessed areas in the first and second scale patterns PAT1A and PAT2A). More specifically, in various implementations each of the position signal components $S_{SIGL1A}$ and $S_{SIGL2A}$ may be representative of the output from a signal processing and control portion of the read head 164. Various characteristics of the signals and the related determination of absolute position have been previously described.

In FIG. 6B, a side view cross-section diagram of a scale portion 670B is similar to the scale portion 670A, and its structure and operation may be understood based on previous description, except with regard to the isolation layer ISOLB and its signal effects. The isolation layer ISOLB is generally a material forming third spatial modulation pattern having a tapering width and constant thickness, as shown in a plan view of that layer at the bottom of FIG. 6B. When the sensing portions 167 are operated by the first circuit configuration(s) (e.g., as indicated by the "1st Circuit Config." labels) the first position signal component $S_{SIGL1B}$ corresponding to the first scale pattern PAT1B may be provided by respective sensing portions 167 with their corresponding spatial phase or offset (e.g., to provide quadrature signals). When the sensing portions 167 are operated by the second circuit configuration(s) (e.g., as indicated by the "2nd Circuit Config." labels), the isolation layer pattern PAT3B and the pattern PAT2B may both provide signal effects and the corresponding second position signal component $S_{SIGL2B}$ may be provided by respective sensing portions 167 with their corresponding spatial phase or offset. That is, the third spatial modulation pattern of the isolating layer is configured to work in combination with the second spatial modulation pattern of the second layer to provide a combined modulation effect of the second and third spatial modulation patterns in the second position signal component sensed using the second circuit configuration. Thus, the position signal components 680B illustrate a first position signal component $S_{SIGL1B}$ corresponding to the first scale pattern PAT1B of the first signal layer SIGL1B, and a second position signal component $S_{SIGL2B}$ corresponding to the second scale pattern PAT2B of the second signal layer SIGL2B, including the influence of a third position signal effect $E_{ISOLB}$ corresponding to the effects of the third scale pattern PAT3B of the isolation layer ISOLB. By way of explanation, at the far left of the position signal components 680B, the sinusoidal variations of the second position signal component $S_{SIGL2B}$ are shown to have low contrast/signal amplitude and a higher "DC" level due to the effects of the wider end of the third scale pattern PAT3B providing a significant amount of "shielding" and/or signal effect at that location for the second signal layer SIGL2B. At the far right of the position signal components 680B, the sinusoidal variations of the second position signal component $S_{SIGL2B}$ are shown to have high contrast/signal amplitude and a lower "DC" level due to the effects of the narrow end of the third scale pattern PAT3B providing a smaller amount of "shielding" and/or signal effect at that location for the second signal layer SIGL2B. It should be appreciated that the signal effect $E_{ISOLB}$ is shown for purposes of explanation, and need not be isolated as a signal. Furthermore, the second position signal component $S_{SIGL2B}$ may require signal processing, as previously disclosed, to isolate it from the effects of the first scale pattern PAT1A and provide a position signal similar to that shown when using the second circuit configuration.

In one implementation, the signal differences in the signal component $S_{SIGL2B}$ caused by the third scale pattern PAT3B of the isolation layer ISOLB at various positions may be analyzed for indicating a coarse absolute range for the scale portion 670B, while the long wavelength beat frequency between the signal components $S_{SIGL1B}$ and $S_{SIGL2B}$ may be utilized for indicating a medium absolute range (e.g., to an accuracy that identifies a particular wavelength P), and the first position signal component $S_{SIGL1B}$ may be utilized for indicating an incremental position within that particular wavelength to a high resolution an accuracy. In various implementations, the third scale pattern PAT3B may be formed as a shaped conductor, e.g., as formed on a printed circuit board, or stamped or etched or formed as a raised portion of greater thickness in a material sheet, or the like.

Figure 6E:
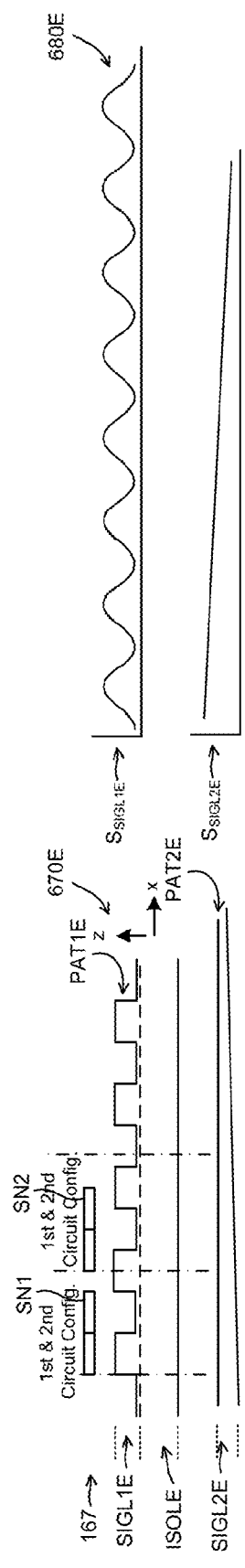
Figure 6F:
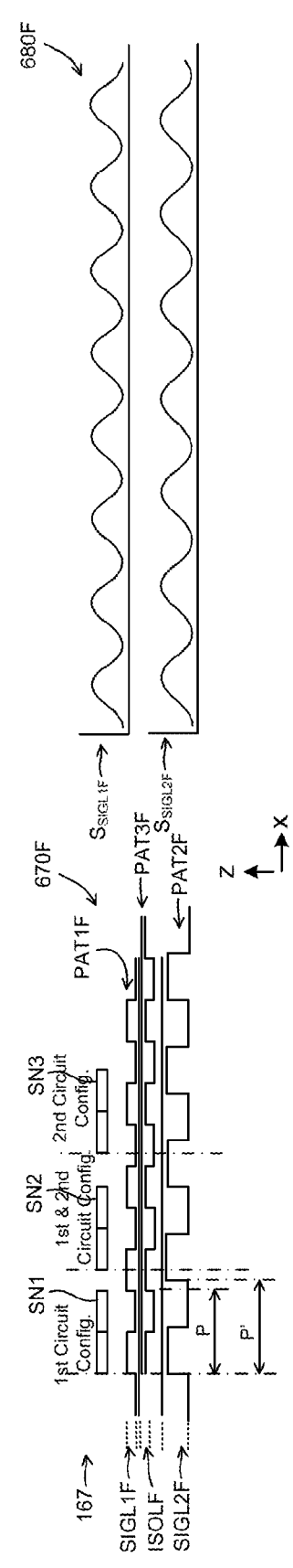

In FIG. 6F, a side view cross-section diagram of a scale portion 670F is analogous to the scale portion 670B, and its structure and operation may be understood based on that previous description, except with regard to the design of isolation layer ISOLF and its signal effects. In particular, the scale portion 670F provides one example of an embodiment wherein the third spatial modulation pattern of the isolating layer is configured in relation to the first spatial modulation pattern of the first layer to at least partially nullify the modulation effect of the first spatial modulation pattern when using the second circuit configuration and thereby at least partially nullify the first position signal component when using the second circuit configuration. In this particular embodiment, the isolation layer ISOLF is generally a material forming a third spatial modulation pattern wherein the first and third spatial modulation patterns are complements such that a combined thickness along the depth direction of the material forming the first and third spatial modulation patterns is nominally constant between the read head and the second layer. In some embodiments, the first and third layers are formed of the same material. In various embodiments, the complementary patterns of the first and third layers may be "width complements", such that the third layer pattern can be visualized something like a photographic negative of the first layer pattern. In the present embodiment, the patterns are "thickness complements". That is, as illustrated in the side cross-section view, the first spatial modulation pattern is a thickness pattern that is periodic and has a wavelength P, the third spatial modulation is a thickness pattern that is periodic and has the wavelength P, and the first and third spatial modulation patterns are shifted along the measuring axis by approximately 180 degrees of spatial phase shift relative to one another.

When the sensing portions 167 are operated by the first circuit configuration, the first position signal component $S_{SIGL1F}$ corresponding to the first scale pattern PAT1F may be provided. When the sensing portions 167 are operated by the second circuit configuration, the isolation layer pattern PAT3F and the pattern PAT2F may both provide signal effects. Thus, the position signal components 680F illustrate a first position signal component $S_{SIGL1F}$ corresponding to the first scale pattern PAT1F of the first signal layer SIGL1F, and a second position signal component $S_{SIGL2F}$ corresponding to the second scale pattern PAT2F of the second signal layer SIGL2F, wherein the influence or effects corresponding to the third scale pattern PAT3F of the isolation layer ISOLF effectively nullify the influence of PAT1F on the signal obtained using the second circuit configuration. That is, no signal processing may be needed to isolate the effect of PAT2F and provide the second position signal component $S_{SIGL2F}$ because PAT3F provides that isolation. To reiterate, because the first and third spatial modulation patterns form thickness complements, they effectively cancel each other's spatial modulation effects for fields that effectively penetrate both pattern layers.

In FIG. 6C, a side view cross-section diagram of a scale portion 670C showing layers which operate similarly to certain layers is shown in the scale portions 670A and 670B. Its structure and operation may be understood based on previous description, taken in combination with the following further explanation. The first signal layer SIGL1C and its related first position signal component $S_{SIGL1C}$ (shown in position signal components 680C) are similar or identical to the first signal layer SIGL1A and its related first position signal component $S_{SIGL1A}$. The second signal layer SIGL2C and its related second position signal component $S_{SIGL2C}$ are similar or identical to the isolation layer ISOLB and its related signal effect $E_{ISOLB}$ outlined with reference to FIG. 6B. That is, it is generally a material forming a second spatial modulation pattern having a tapering width and constant thickness. When the sensing portions 167 are operated by the first circuit configuration, the first position signal component $S_{SIGL1C}$ corresponding to the first scale pattern PAT1C may be provided. When the sensing portions 167 are operated by the second circuit configuration, the pattern PAT2C (similar to PAT3B of FIG. 6B) may provide the second position signal component $S_{SIGL2C}$, which may require signal processing, as previously disclosed, to isolate it from the effects of the first scale pattern PAT1A, when using the second circuit configuration. The isolation layer ISOLC, if present, is generally a material forming a rectangular and/or uniform layer with a consistent width and thickness. It may be consider optional, or as an integrated part of the first or second layers.

FIG. 6E may be understood as a side view cross-section diagram of a scale portion 670E showing layers which may be formed and operated similarly to the layers of the scale portion 670C, except that the second spatial modulation pattern of the pattern PAT2E includes a thickness modulation rather than a width modulation. That is, it is generally a material forming a second spatial modulation pattern having a tapering thickness and constant width. The thicker material at one end of the layer may provide more eddy current effects compared to the thinner end of the layer, for example, for a field that penetrates the entire layer. When the sensing portions 167 are operated by the first circuit configuration, the first position signal component $S_{SIGL1E}$ (shown in position signal components 680E) corresponding to the first signal layer SIGL1E and the first scale pattern PAT1E may be provided. When the sensing portions 167 are operated by the second circuit configuration, the second signal layer SIGL2E and the pattern PAT2E may provide the second position signal component $S_{SIGL2E}$, which may require signal processing, as previously disclosed, to isolate it from the effects of the first scale pattern PAT1E, when using the second circuit configuration. The isolation layer ISOLE, if present, is generally a material forming a rectangular and/or uniform layer with a consistent width and thickness. It may be considered optional, or as an integrated part of the first or second layers.

FIG. 6D may be understood as a side view cross-section diagram of a scale portion 670D showing layers which may be formed and operated similarly to the layers of the scale portion 670A, except that the second spatial modulation pattern of the second signal layer SIGL2D and the pattern PAT2D includes a thickness modulation similar to a thickness taper along its recessed or thinner scale elements. That is, it is generally a material forming a second spatial modulation pattern having a tapering thickness and constant width in its recess-type scale elements. Such configurations are described in more detail in the previously incorporated '266 application. The thinner recesses at one end of the layer may provide a signal more similar to their adjacent plate-type elements (where a low periodic signal contrast or amplitude is provided) as compared to the end of the layer where the recess depth is maximum (where a higher periodic signal contrast or amplitude is provided). In this embodiment, the second position signal component $S_{SIGL2D}$ (shown in position signal components 680D) may require signal processing, as previously disclosed, to isolate it from the effects of the first signal layer SIGL1D and the first scale pattern PAT1D, when using the second circuit configuration. The isolation layer ISOLD, if present, is generally a material forming a rectangular and/or uniform layer with a consistent width and thickness. It may be considered optional, or as an integrated part of the first or second layers.

Figure 6G:
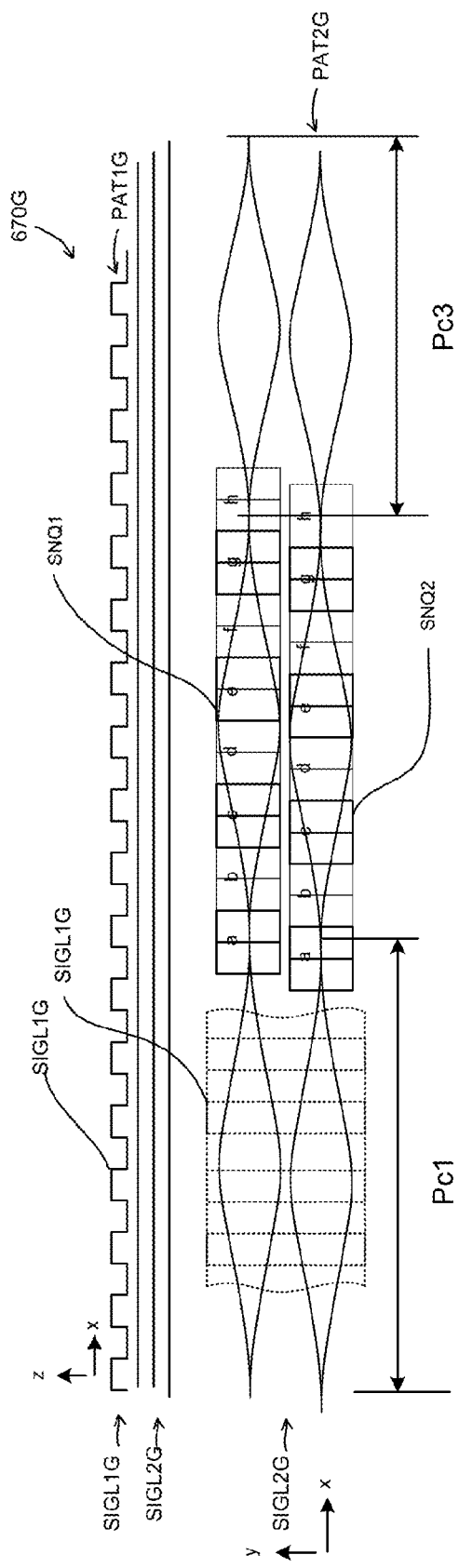

FIG. 6G shows an embodiment wherein an alternative read head configuration is used in conjunction with a corresponding second scale modulation pattern to fulfill the absolute position signal principles disclosed herein. In the scale portion 670G, a first signal layer SIGL1G and corresponding first scale pattern PAT1G (i.e., shown in a side view relative to the x and z axes) are similar to those of the scale portion 670A. A second signal layer SIGL2G, corresponding to the second scale pattern PAT2G (shown in a plan view in the lower part of FIG. 6G, with a plan view of a portion of the pattern PAT1G shown in dashed outline)

includes two tracks of sinusoidally shaped areas, which may have different individual lengths or "periods" (e.g., Pc1, Pc3, and so on) along the X direction. Similarly to previous stacked scale layers, the first signal layer is stacked on the second signal layer. Overlaying and/or aligned with the two tracks of PAT2G are sensing portion sets SNQ1 and SNQ2 comprising member sensing portions a-h (e.g., each of which may be similar to the sensing portion SNX, described previously). Since the spacings between the member sensing portions (e.g., member a and member h) are fixed, the different lengths (e.g., Pc1) of the sinusoidal portions may provide signals having different phase relationships, which can be used to identify which sinusoidal portion is being sensed. The two tracks of PAT2G may have a relationship that extends the absolute range and/or resolves potential signal ambiguities. As such, various sensing portions (e.g., some or all of sensing portions a-h) may be operated using a first circuit configuration to provide a first position signal component corresponding to PAT1G, and various sensing portions (e.g., some or all of sensing portions a-h) may be operated using a second circuit configuration to provide a second position signal component corresponding to PAT2G, wherein the second position signal component includes a signal characteristic that provides a plurality of unique values relative to the first position signal component at corresponding positions along the absolute range.

Figure 7:
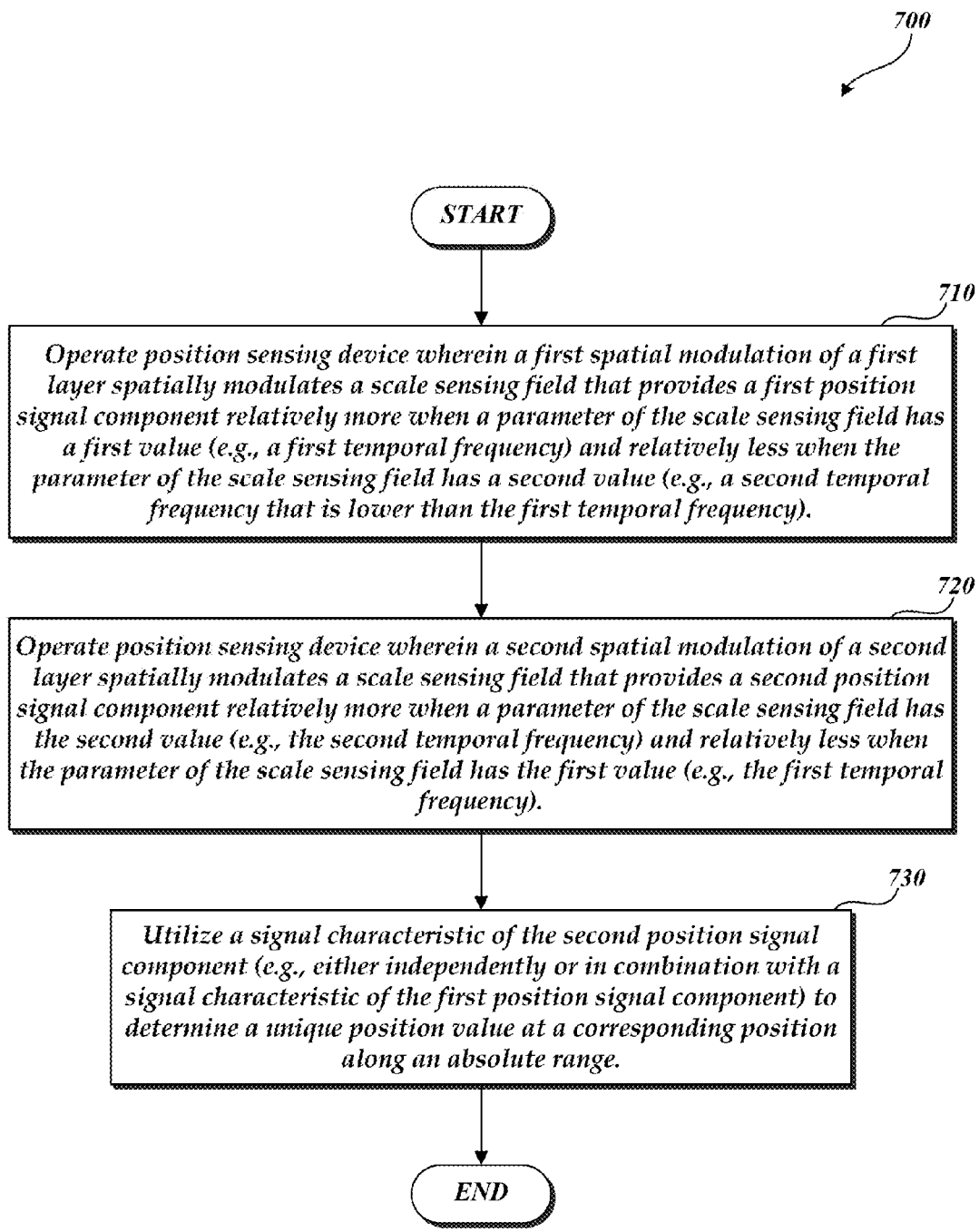
FIG. 7 is a flow diagram illustrating one exemplary embodiment of a routine for operating a position sensing device including a scale portion having layers in a stacked configuration, according to principles disclosed herein.

FIG. 7 is a flow diagram illustrating one exemplary embodiment of a routine 700 for operating a position sensing device including a scale portion having layers in a stacked configuration, according to principles disclosed herein. As shown in FIG. 7, at a block 710, a position sensing device (e.g., a hand tool type caliper) is operated wherein a first spatial modulation of a first layer spatially modulates a scale sensing field that provides a first position signal component relatively more when a parameter of the scale sensing field has a first value (e.g., a first temporal frequency) and relatively less when the parameter of the scale sensing field has a second value (e.g., a second temporal frequency that is lower than the first temporal frequency). At a block 720, the position sensing device is operated wherein a second spatial modulation of a second layer spatially modulates a scale sensing field that provides a second position signal component relatively more when a parameter of the scale sensing field has the second value (e.g., the second temporal frequency) and relatively less when the parameter of the scale sensing field has the first value (e.g., the first temporal frequency). At a block 730, a signal characteristic of the second position signal component is utilized (e.g., either independently or in combination with a signal characteristic of the first position signal component) to determine a unique position value at a corresponding position along an absolute range.

The various components described above may be positioned differently and take other forms and combinations than those outlined above, as will be appreciated by one of ordinary skill in the art based on this disclosure. For example, the disclosed scale patterns may alternatively be formed in a curved configuration to follow a circular measuring axis, to form a rotary encoder. As another example, while several of the above described scale patterns include recessed areas, other types of plate abatement features may be used (e.g., non-conductive areas). In general, for plate abatement features a characteristic that may be varied may include the amount of a non-conductive area, the amount of a recessed area, the recess depth of a recessed area, etc. For plate features, a characteristic that may be varied may include the amount of the plate area, the plate height, etc.

As another example, binary code elements for an absolute signal range identification portion (or alternatively for a stand-alone scale pattern) may be formed utilizing similar techniques as the other described scale elements, and multiple read head sensors may be utilized to read such a code. As another example, additional variations in the heights of the plate areas or depths of the recessed areas may be utilized to implement even higher order codes (e.g., utilizing 3+ variations).

The various embodiments outlined above can be combined to provide further embodiments. All of the U.S. patents and U.S. patent applications referred to in this specification are incorporated herein by reference, in their entirety. For example, with respect to the example read heads 164 and associated sensing portions and circuits, it will be appreciated that other read head(s), circuits and signal processing disclosed in the previously incorporated '494 and '389 patent references may be adapted to work in conjunction with various scale configurations disclosed herein. The read heads, circuits and signal processing outlined herein are exemplary only, and not limiting.

In general, in the following claims, the terms used should not be construed to limit the claims to the specific embodiments disclosed in the specification and the claims, but should be construed to include all embodiments formed in accordance with the teachings herein along with the full scope of equivalents to which such claims are entitled.

The invention claimed is:

1. A position sensing device usable to measure a position of a first member with respect to a second member along a measuring axis, the position sensing device comprising:
   a scale comprising first and second layers that extend along the measuring axis and that are stacked on one another along a depth direction that is approximately normal to the scale layers, the first layer comprising material forming a first spatial modulation pattern along the measuring axis, and the second layer comprising material forming a second spatial modulation pattern along the measuring axis that is different than the first spatial modulation pattern over an absolute range along the measuring axis; and
   a read head for being moved relative to the scale along a direction of the measuring axis, the read head comprising a sensing portion arranged along the depth direction relative to the scale and configured to produce at least one scale sensing field that may be modulated by the first and second spatial modulation patterns of the first and second layers and provide first and second position signal components based on using first and second circuit configurations to provide a first smaller signal-sensing depth and a second smaller signal-sensing depth for the at least one scale sensing field;
   and configured wherein:
   the first layer is closer to the read head along the depth direction than the second layer, and the first spatial modulation pattern of the first layer provides a dominant first position signal component sensed using the first circuit configuration;
   the second spatial modulation pattern of the second layer provides a significant second position signal component sensed using the second circuit configuration and a less significant second position signal component when using the first circuit configuration; and
   the first and second spatial modulation patterns are configured such that the second position signal component includes a signal characteristic that provides a plurality of unique values relative to the first position signal component at corresponding positions along the absolute range.

2. The position sensing device of claim 1, configured wherein the second spatial modulation pattern of the second layer provides an insignificant second position signal component when using the first circuit configuration.

3. The position sensing device of claim 1, wherein the at least one scale sensing field is a changing field and the first circuit configuration corresponds to a higher temporal frequency or frequency range of the scale sensing field, and the second circuit configuration corresponds to a lower temporal frequency or frequency range of the scale sensing field.

4. The position sensing device of claim 3, wherein the first and second circuit configurations are operate according to at least one of one of a) or b), comprising:
  a) the first circuit configuration provides a first scale sensing field at the higher temporal frequency or frequency range at a first time, the second circuit configuration provides a second scale sensing field at the lower temporal frequency or frequency range at a second time, and the read head senses the first position signal component at the first time and the second position signal component at the second time, or
  b) the first circuit configuration senses the modulation of the at least one scale sensing field using a higher limited or filtered frequency range which corresponds to the higher temporal frequency or frequency range, and the second circuit configuration senses the modulation of the at least one scale sensing field using a lower limited or filtered frequency range which corresponds to the lower temporal frequency or frequency range.

5. The position sensing device of claim 4, wherein the first and second circuit configurations operate according to b), and the read head is configured to generate a changing scale sensing field that simultaneously includes both the higher and lower temporal frequencies or frequency ranges.

6. The position sensing device of claim 3, wherein the first and second circuit configurations are responsive to respective eddy currents that arise in a material of the first and second spatial modulation patterns and modulate the at least one scale sensing field in order to provide the first and second position signal components.

7. The position sensing device of claim 3, wherein the first layer has a thickness along the depth direction that is at least one times a first skin depth, wherein that first skin depth is determined based on a material forming the first spatial modulation pattern and the higher temporal frequency or frequency range corresponding to the first circuit configuration.

8. The position sensing device of claim 3, wherein the first layer has a thickness along the depth direction that is at most 0.5 times a second skin depth, wherein that second skin depth is determined based on a material forming the first spatial modulation pattern and the lower temporal frequency or frequency range corresponding to the second circuit configuration.

9. The position sensing device of claim 3, wherein a thickness along the depth direction of the material forming the second spatial modulation pattern of the second layer is at least two times a thickness along the depth direction of the material forming the first spatial modulation pattern of the first layer.

10. The position sensing device of claim 1, wherein the scale further comprises an isolating layer comprising one of a) a material forming a uniform layer, or b) a material forming a third spatial modulation pattern, that extends along the measuring axis and is located between the first and second layers.

11. The position sensing device of claim 10, wherein the isolating layer is a material forming a uniform layer, and a thickness of the first layer added to a thickness of the isolating layer along the depth direction is at least one times a first skin depth, wherein that first skin depth is determined based on the material forming the uniform layer and the higher temporal frequency or frequency range corresponding to the first circuit configuration.

12. The position sensing device of claim 10, wherein:
  the isolating layer is a material forming a third spatial modulation pattern; and
  the third spatial modulation pattern of the isolating layer is configured in relation to the first spatial modulation pattern of the first layer to at least partially nullify the modulation effect of the first spatial modulation pattern when using the second circuit configuration and thereby at least partially nullify the first position signal component when using the second circuit configuration.

13. The position sensing device of claim 12, wherein:
  the material forming the first and third spatial modulation patterns is the same material; and
  the first and third spatial modulation patterns are complements such that a combined thickness along the depth direction of the material forming the first and third spatial modulation patterns is nominally constant between the read head and the second layer.

14. The position sensing device of claim 13, wherein the first spatial modulation pattern is periodic and has a wavelength P, the third spatial modulation is periodic and has the wavelength P, and the first and third spatial modulation patterns are shifted along the measuring axis by approximately 180 degrees of spatial phase shift relative to one another.

15. The position sensing device of claim 13, wherein each of the first and third spatial modulation patterns comprise one of a) material thickness modulations along the depth direction, or b) material width modulations along a direction transverse to the depth direction and the measuring axis.

16. The position sensing device of claim 10, wherein:
  the isolating layer is a material forming a third spatial modulation pattern; and
  the third spatial modulation pattern of the isolating layer is configured work in combination with the second spatial modulation pattern of the second layer to provide a combined modulation effect of the second and third spatial modulation patterns in the second position signal component sensed using the second circuit configuration.

17. The position sensing device of claim 1, wherein the first spatial modulation pattern is periodic and has a first wavelength P, and the second spatial modulation pattern comprises at least one of a) a periodic pattern that has a second wavelength P' different than the wavelength P to provide a spatially periodic second position signal component that provides a plurality of unique phase relationship values relative to a spatially periodic first position signal component at corresponding positions along the absolute range, or b) a pattern that varies linearly or nonlinearly to provide a second position signal component that provides a plurality of unique signal amplitude values relative to the first position signal component at corresponding positions along the absolute range.

18. The position sensing device of claim 1, wherein each of the first or second spatial modulation patterns comprise one of a) material thickness modulations along the depth direction, or b) material width modulations along a direction transverse to the depth direction and the measuring axis.

19. The position sensing device of claim 18, wherein the material thickness or width modulations of the first or second spatial modulation patterns are fabricated by machining or forming a homogeneous material, or in printed circuit board materials using printed circuit board fabrication techniques.

20. The position sensing device of claim 1, wherein the first and second layers comprise fabricated portions of a monolithic piece of scale material, or comprise layers in multilayer printed circuit board.

\* \* \* \* \*